US 9,854,297 B2

(12) United States Patent
Francisco (10) Patent No.: US 9,854,297 B2
(45) Date of Patent: Dec. 26, 2017

(54) SERVICE ENTRY DEVICE (71) Applicant: Comcast Cable Communications, LLC, Philadelphia, PA (US)

(72) Inventor: Mark Francisco, Clarksburg, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 638 days.

(21) Appl. No.: 13/944,414

(22) Filed: Jul. 17, 2013

(65) Prior Publication Data

US 2014/0026170 A1   Jan. 23, 2014

Related U.S. Application Data (63) Continuation of application No. 12/603,089, filed on Oct. 21, 2009, now Pat. No. 8,532,272.

(51) Int. Cl.
| *H04M 11/00* | (2006.01) |
| *H04N 21/436* | (2011.01) |
| *H04L 12/28* | (2006.01) |
| *H04L 12/54* | (2013.01) |
| *H04L 12/707* | (2013.01) |
| *H04L 12/911* | (2013.01) |
| *H04B 1/40* | (2015.01) |

(52) U.S. Cl.
CPC ... *H04N 21/43615* (2013.01); *H04L 12/2834* (2013.01); *H04L 12/5692* (2013.01); *H04L 45/24* (2013.01); *H04L 47/70* (2013.01)

(58) Field of Classification Search
CPC ..... H04L 67/04; H04L 67/327; H04L 69/329; H04W 36/0011; H04W 36/08; H04W 88/005
USPC ..... 379/93, 88.01–88.19; 455/436, 439, 442, 455/74
See application file for complete search history.

(56) References Cited

U.S. PATENT DOCUMENTS

| 7,013,303 | B2 | 3/2006 | Faybishenko et al. |
| 7,299,291 | B1 * | 11/2007 | Shaw ................. H04L 65/4069 709/203 |
| 8,228,861 | B1 * | 7/2012 | Nix ....................... H04W 36/00 370/329 |

(Continued)

FOREIGN PATENT DOCUMENTS

| CA | 2716911 | 10/2010 |
| CA | 2751106 | 8/2011 |

(Continued)

OTHER PUBLICATIONS

European Office Action—EP Appl. 10187036.8—dated Sep. 4, 2015.

(Continued)

*Primary Examiner* — Solomon Bezuayehu
(74) *Attorney, Agent, or Firm* — Banner & Witcoff, Ltd.

(57) ABSTRACT

A system is described in which, in some embodiments, a centralized service entry device may be used to coordinate communications going into and out of a home or premises. The service entry device may be physically connected to a plurality of external access networks, such as a cable television coaxial or fiber connection and a twisted-pair wire connection, and may coordinate access to those networks by a plurality of in-home devices. Within the home, the system may include a plurality of client devices to assist in the coordination of communications with devices in different rooms within the home.

20 Claims, 6 Drawing Sheets

(56) References Cited

U.S. PATENT DOCUMENTS

| | | | | |
|---|---|---|---|---|
| 8,254,930 | B1* | 8/2012 | Mauer | H04W 36/0083 455/436 |
| 9,324,375 | B1* | 4/2016 | Casalena | H04L 65/80 |
| 2002/0172217 | A1* | 11/2002 | Kadaba | H04L 1/0002 370/443 |
| 2003/0212764 | A1* | 11/2003 | Trossen | H04W 36/0011 709/219 |
| 2003/0231861 | A1* | 12/2003 | Yoo | G11B 27/105 386/248 |
| 2004/0037260 | A1 | 2/2004 | Kakemizu et al. | |
| 2004/0103232 | A1 | 5/2004 | Clayton | |
| 2004/0103282 | A1 | 5/2004 | Meier et al. | |
| 2005/0074019 | A1 | 4/2005 | Handforth et al. | |
| 2005/0235308 | A1* | 10/2005 | Dellow | G06F 21/85 725/25 |
| 2005/0265309 | A1 | 12/2005 | Parandekar | |
| 2006/0002370 | A1 | 1/2006 | Rabie et al. | |
| 2006/0221897 | A1 | 10/2006 | Nagy et al. | |
| 2007/0014259 | A1* | 1/2007 | Fajardo | H04W 36/0011 370/331 |
| 2007/0025295 | A1* | 2/2007 | Kono | H04W 36/0072 370/331 |
| 2007/0147234 | A1 | 6/2007 | Walter et al. | |
| 2007/0147401 | A1 | 6/2007 | Carew et al. | |
| 2008/0043970 | A1 | 2/2008 | Scholes et al. | |
| 2008/0043971 | A1 | 2/2008 | Barchi | |
| 2008/0250010 | A1 | 10/2008 | Rathod et al. | |
| 2008/0256255 | A1* | 10/2008 | Mordovskoi | H04N 21/2381 709/231 |
| 2008/0305813 | A1 | 12/2008 | Rao | |
| 2009/0089832 | A1* | 4/2009 | Kendall | H04N 5/76 725/38 |
| 2009/0093264 | A1 | 4/2009 | Heredia et al. | |
| 2009/0135843 | A1 | 5/2009 | Veillette | |
| 2009/0234713 | A1 | 9/2009 | Bi et al. | |
| 2010/0085948 | A1 | 4/2010 | Yu et al. | |
| 2010/0153985 | A1* | 6/2010 | Dey | H04N 21/41407 725/25 |
| 2012/0278842 | A1* | 11/2012 | Look | G11B 27/034 725/63 |
| 2014/0040950 | A1* | 2/2014 | Clemente | H04N 1/00204 725/37 |

FOREIGN PATENT DOCUMENTS

| | | |
|---|---|---|
| EP | 10187036 | 10/2010 |
| EP | 11179627 | 8/2011 |
| WO | 200221841 A1 | 3/2002 |

OTHER PUBLICATIONS

European Office Action—EP Appl. 11179627.2—dated Feb. 2, 2016.
EP 10187036.8, Office Action dated Jan. 17, 2012.
Saito T et al. "Home Gateway Architecture and its Implementation," IEEE Transactions on Consumer Electronics, IEEE Service Center, New York, NY, US vol. 46, No. 4.
EP 10187036.8, Search Report, dated Jan. 14, 2011.
BP Tiwari: "Understanding WiMAX Network Architecture".
WiMAX Forum Network Architecture.
Samhat et a: "Security and AAA Architecture for WiFi-WiMAX Mesh Network".
EP 11179627.2 Partial EP Search Report dated Feb. 8, 2012.
BelAir Networks, Data Sheet, BelAir I 00S Strand-Mounted Wireless Multi-service Node, www.belairnetworks.com; BDMAI0020-B08, 2 pages.
BelAir Networks, Data Sheet, BelAir I 00T Wireless Mesh Node, www.belairnetworks.com; BDMAI500I-A0I, 2 pages.
Jun. 6, 2017—Canadian Office Action—CA 2,751,106.
Canadian Office Action—CA App 2,716,911—dated Aug. 25, 2016.
Response to European Office Action—EP 10187036.8—dated May 28, 2015.

* cited by examiner

SERVICE ENTRY DEVICE

CROSS-REFERENCE TO RELATED APPLICATIONS

This application is a continuation of pending U.S. patent application Ser. No. 12/603,089, entitled "Service Entry Device" and filed Oct. 21, 2009. The above-identified application is hereby incorporated by reference.

FIELD OF ART

The features described herein generally relate to an interface module for electronic devices in a premises, such as a home.

BACKGROUND

As time goes by, we are all becoming more and more connected. Within any typical home, there are likely to be several consumer electronic devices that can receive signals from, and/or send signals to, an outside communication network. Cable television set-top boxes, Internet computers, cell phones, personal data assistants (PDAs), satellite dishes and telephones (old-fashioned analog, and newer digital) are just a few examples. Using the FIG. 1 home 100 as an example, there may be a number of service entry points through which these devices communicate with a corresponding outside access network. For example, there may be a coaxial cable (or hybrid fiber coax) entry point 101 for a coaxial cable from a local cable company's coaxial cable/hybrid fiber coax plant (not shown); a standard twisted pair telephone wire entry point 102 for a twisted-pair wire from a public-switched telephone network (PSTN—not shown); and a satellite dish 103 that communicates with satellite 104. Other devices may use their own interfaces, such as a cell phone 105 communicating with a cellular network 106.

Figure 1:
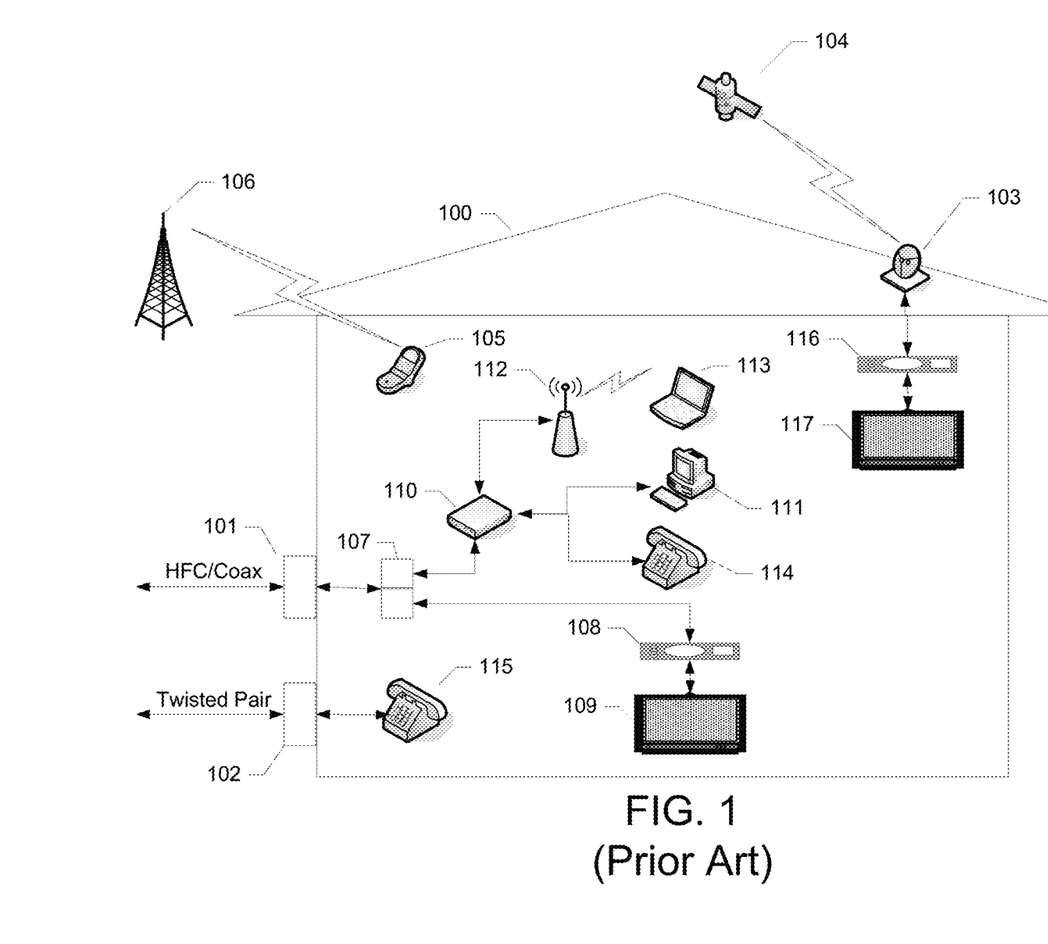
FIG. 1 illustrates a prior art home having multiple electronic devices that communicate with various communication networks outside the home.

These service entry points 101, 102, 103 allow the external access networks to communicate with devices within the home. The actual connections within the home may take various forms. The cable entry point 101 may have a coaxial cable that is coupled to an RF splitter 107 that splits the signal, where one signal is sent to a set-top box 108 for viewing cable television programming on a television 109, while another signal is sent to a cable modem 110 to provide Internet connectivity for a computer 111, or wireless access point 112 and wireless device 113 (e.g., a laptop computer), or IP (Internet Protocol) connectivity for a voice-over-IP (VoIP) telephone 114. The twisted pair entry point 102 may have a twisted pair copper wire that is connected to an analog telephone 115, while the satellite entry point 103 may provide satellite television signals to another set-top box 116, for viewing on television 117.

The availability of all of these devices and all of these access networks allows users to benefit from a wide variety of services, but it also complicates the system. If an access network wishes to, for example, upgrade its program code or communication protocol to improve a feature or add new features, the various end user devices in the home will also need to cooperate with the upgrade (e.g., they would need to download new drivers). Requiring the cooperation of all of these devices reduces service velocity (i.e., it slows down the access network's ability to roll out new services). There is, however, an ever-present demand for more service functionality and faster updates.

SUMMARY

This summary is not intended to identify critical or essential features of the inventions claimed herein, but instead merely summarizes certain features and variations thereof.

In some embodiments, a centralized service entry device may be connected to a variety of external access networks, such as a coaxial cable connection, a fiber optic cable connection, a twisted-pair wire connection, a cellular or wireless connection, etc. The service entry device may also be connected to an in-home network of user devices, and may coordinate how those user devices access the external networks.

Outgoing communications may be aggregated from a plurality of those devices at the service entry device, and may be multiplexed for transmission across one or more of the external access networks. For example, a single request for content originating from one of the in-home devices may result in a plurality of external requests sent over multiple external interfaces to multiple external networks. A common in-home network may be used to coordinate communications between the in-home devices and the service entry device, as well as between in-home devices, to allow those devices to share content with one another.

Changes in communication protocols, either on the external access network side or the in-home network side of the service entry device, may be made with the service entry device, and without requiring involvement of the devices on the other side. For example, an external access network may update its communication protocol without requiring that each end device in the user's home update itself—the update of the service entry device may be sufficient.

In some embodiments, the service entry device may retain profile information for the various users in the home, and may implement user preferences. The device may use this profile information to choose from a variety of possible supplier devices to provide content requested by a user, and suppliers may even be switched in mid-stream while a user is receiving content from one of the suppliers. The profile information may also be used by the service entry device to convert received content that is not a perfect match for the requesting device's profile.

The service entry device may also implement policy for the in-home network, and prioritize communications and use of the external access network.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 5 illustrates an example request process, while

DETAILED DESCRIPTION

Figure 2:
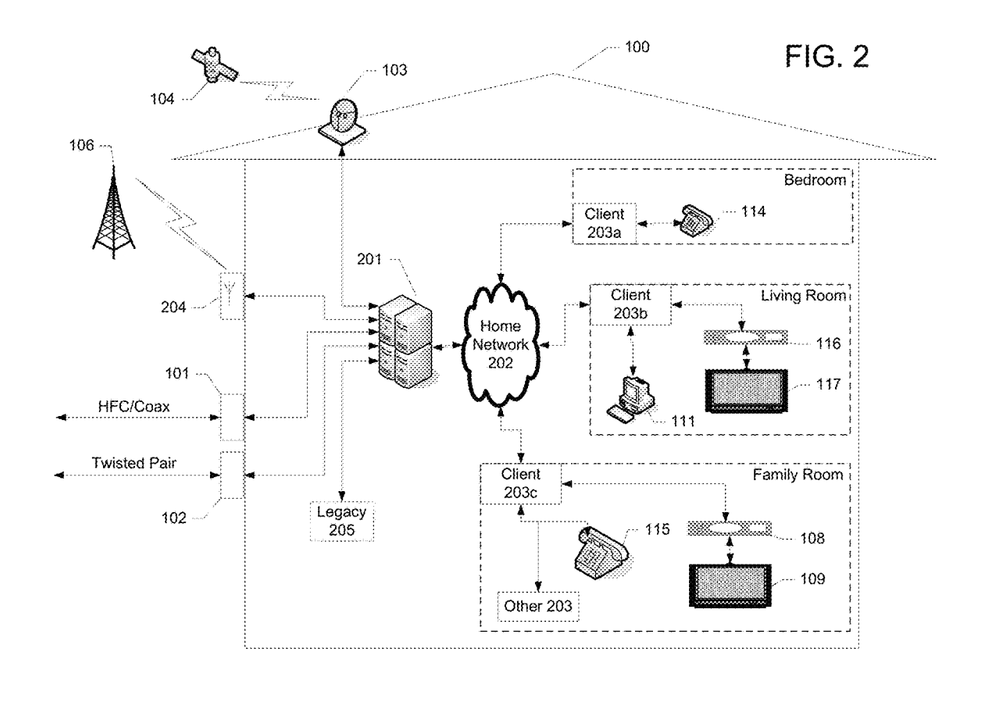
FIG. 2 illustrates an example of the home from FIG. 1, but modified to incorporate a service entry point device.

As illustrated in FIG. 2, a service entry device 201 may be added to a home 100. The service entry device 201 may act as a central coordinator for communications going into and out of the home. The entry points 101, 102, 103 discussed above remain, and they each may still be connected to their corresponding access networks in the same manner as in FIG. 1. However, inside the home, the entry points 101, 102, 103 need not be directly connected to their corresponding user devices. Instead, the entry points 101, 102, 103 may first be connected to a service entry device 201. The internal details of an example service entry device 201 are discussed below with respect to FIG. 3, but in the FIG. 2 general diagram, it is enough to note that the service entry device 201 may include different physical interfaces needed to couple to the entry points 101, 102, 103. So, for example, the service entry device 201 may include a coaxial physical interface and/or optical interface for cable entry point 101, a twisted pair wire physical interface for PSTN entry point 102, and satellite dish wiring physical interface for satellite dish 103.

Similarly, the various user devices in the home are also not necessarily directly connected to their respective access network service entry points. Instead, they are shown coupled to an in-home network 202, via in-room clients 203a-c. The in-home network 202 may be implemented using any desired data transport network (e.g., MoCA—Multimedia Over Coax Allliance, Ethernet, CAT-5, fiber, wireless, etc.) to distribute data within the home, and may use multiple transport types if desired (e.g., CAT-5 and wireless). The edges of the in-home network 202 may include clients 203a-c located at various locations around the home, proximate to the user devices serviced by each client. For example, there may be a device client 203a-c in each room of the house. FIG. 2 illustrates bedroom client 203a, living room client 203b and family room client 203c each acting as an interface between in-home network 202 and the devices located within their respective rooms.

Each client 203a-c may have a series of physical interfaces corresponding to the various user devices. So, for example, the client 203a-c may include one or more Ethernet/CAT-5 interfaces to connect to computer 111, wireless access point 112 and digital (e.g., voice-over-internet-protocol, or VoIP) telephone 114; coaxial cable interface to connect to set-top box 108; satellite wiring interface to connect to set-top box 116; twisted-pair interface to connect to analog telephones 114; and any other desired interface (e.g., fiber, wireless, etc.) to connect to other types of devices 203 (e.g., intelligent appliances, fax machines, security systems, etc.).

For some external access networks, it may be desirable to add a service entry point to the user's home. As illustrated in the FIG. 2 example, an additional entry point 204 is shown for communicating with the cellular telephone network 106. The additional service entry point may be used to add a new external access network to the universe of networks managed by service entry device 201 and made available to the devices within the home. So, for example, adding cellular telephone network 106 in the FIG. 2 example may allow other devices within the home (e.g., computer 111) to use the cellular telephone network 106.

The discussion above of the FIG. 2 example shows how the various service entry points may all be connected to the service entry device 201. In some embodiments, it may be desirable to still allow certain legacy connections to be made, bypassing the service entry device 201. So, for example, one or more of the entry points 101, 102, 103, 204 may be directly connected to one or more legacy components 205, such as an analog telephone, cable set-top box, etc. This may be useful, for example, when a particular component is not supported by the service entry device 201, or if the access network wishes to directly manage at least a portion of the usage of that network. To give one example, a cable television cablecard device may be used within the home to access secured (encrypted) content from a cable television network. To avoid compromising that security, the FIG. 2 example may still allow the legacy component 205 cablecard interface to directly connect to the cable entry point 101 (or, it may receive a signal from entry point 101 but split by an RF splitter).

Figure 3:
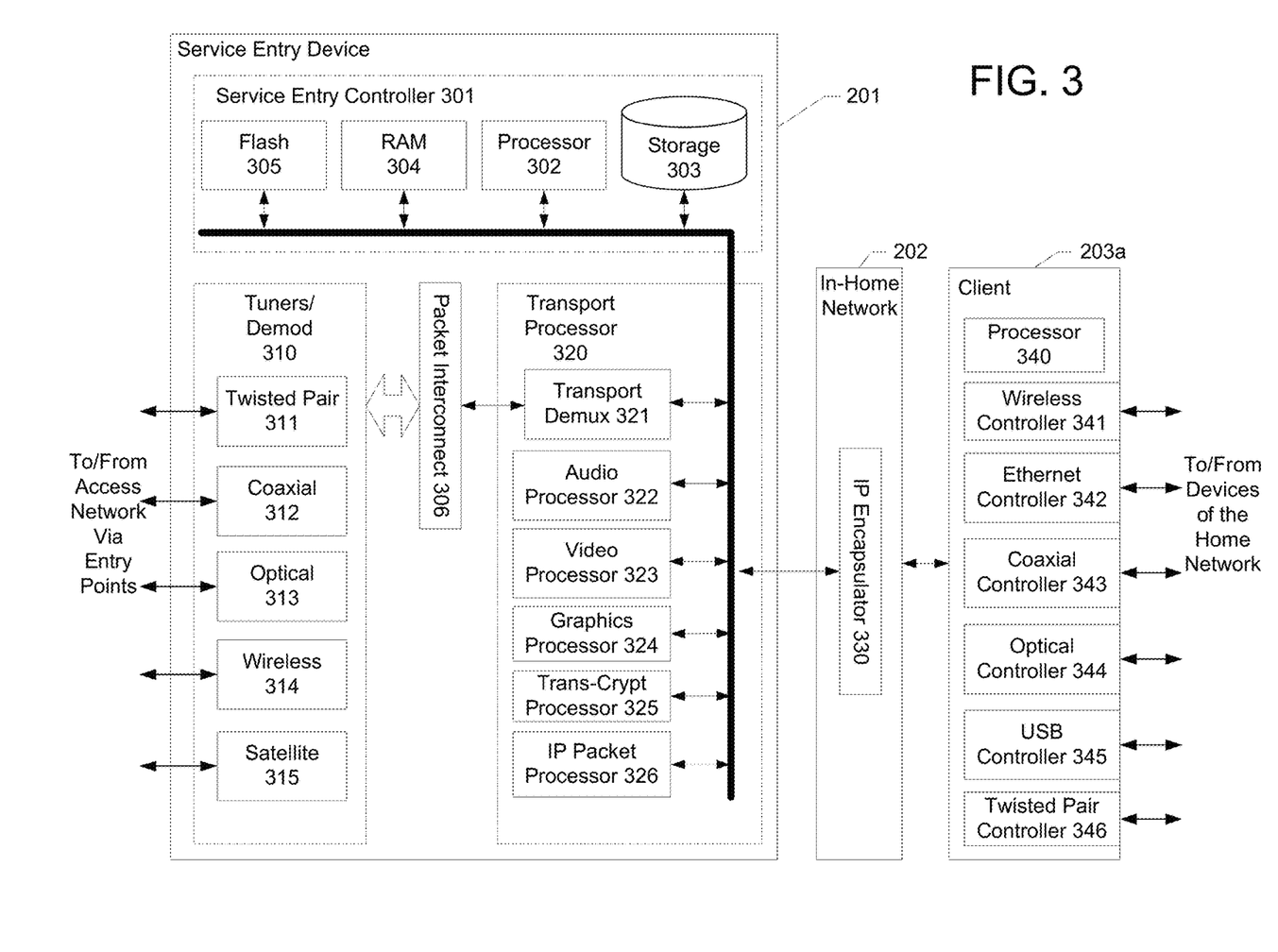
FIG. 3 illustrates a more detailed example of the service entry point device shown in FIG. 2.

FIG. 3 illustrates internal components of an example service entry device 201, in-home network 202 and client 203a. Connections to and from the external access network (via entry points 101, 102, 103, 204, etc.) are shown on the left, while connections to and from the devices within the home are shown on the right.

The service entry device 201 may be implemented using computer components. So, for example, there may be a service entry controller 301 that is responsible for managing the service entry device 201, and performing the various features described herein for that device 201. The controller 301 may include one or more processors 302, which may execute instructions stored in one or more computer-readable media, such as storage 303. Storage 303 may be implemented using any desired form of data storage mechanism, such as a hard drive, floppy disk, compact disk, random access memory (RAM), etc. FIG. 3 also illustrates additional RAM 304 and flash memory 305, which may be used when carrying out operations and executing programs. Example methods and processes performed by the processor 302 and/or controller 301 are described further below.

In addition to the controller 301, the service entry device 201 may include a tuner/demodulator circuit 310. The tuner/demod circuit 310 may include a variety of physical interface circuits that physically connect to the various access network entry points 101, 102, 103 at the home, and may be in a physical configuration compatible with those external access networks. The tuner/demod circuit 310 may be configured to receive the various data signals from the various access networks, and process them into an orderly packet arrangement to be transmitted via a packet interconnect 306 to other components in the device 201. For example, the tuner/demod 304 may include a twisted pair interface circuit 311. The twisted pair interface circuit 311 may include twisted pair wire connectors (not shown) that terminate twisted pair wires from the twisted pair service entry point 102. The twisted pair interface circuit 311 may further include processing circuitry (e.g., another processor executing instructions from an electronic or computer-readable medium, such as a memory device in the circuit) that is configured to detect the signals received over the twisted pair, and convert them into digital packets suitable for transmission over the packet interconnect 306. For outgoing transmissions, the tuner/demod 310 may distribute outgoing transmissions across the various interfaces, such that multiple interfaces may be used to transmit outgoing data for the same end user device.

The twisted pair interface circuit 311 may also include one or more transmitters, and the interface circuit 311's processor may be further configured to receive data transmission requests over the packet interconnect 306, and transmit data back over the twisted pair connection to the PSTN in accordance with the data transmission protocols of the PSTN access network. Accordingly, the interface circuit 311 (and other interface circuits described below) may be configured with the transmission and reception communication protocols of the access network to which it is connected.

The tuner/demod 310 may further include a coaxial interface circuit 312. Similar to the twisted pair interface circuit 311, the coaxial interface circuit 312 may include a coaxial cable terminator connected to a cable network service entry point 101 via a coaxial cable, and may be configured (e.g., with software and a processor) with communication protocols for the coaxial cable access network. This may include, for example, one or more quadrature amplitude modulation (QAM) demodulators configured to tune to and demodulate various channels (e.g., the 6 Mhz channels in use today) carried on a coaxial cable. The coaxial interface 312 may further include software and circuitry to act as a Multimedia Terminal Adapter (MTA) in compliance with the Cablelabs Data Over Cable Service Interface Specification (DOCSIS) standards, communicating in two directions via the coaxial cable access network.

Like the twisted pair interface circuit 311, the coaxial interface circuit 312 may also be configured (e.g., via software and a processor) to transmit and/or receive data packets to/from the packet interconnect 306.

The tuner/demod 310 may also include other interface circuits, for different access networks. For example, an optical interface circuit 313 may be included, connecting to a fiber optic service entry point, and configured to communicate over the fiber access network using the protocols of the fiber network, and to communicate with the packet interconnect 306 as well. A wireless interface 314 may also be provided, having wireless antenna circuitry configured to communicate with a wireless access network (e.g., cellular telephone, WiMax local wireless, etc.), and to communicate with the packet interconnect 306. FIG. 3 also illustrates a satellite interface circuit 315, which may be connected to a satellite dish antenna and communicate with a satellite network, and which may also include circuitry configured to communicate with packet interconnect 306.

In the discussion above, the various interfaces of the tuner/demod circuit 310 each allow communications with a corresponding external access network, and each communicate with the packet interconnect 306. The packet interconnect 306 may be any wired and/or wireless transmission medium that may be shared by the various interfaces. For example, the interconnect 306 might simply be data line traces internal to the circuitry of the entry device 201. Alternatively, the interconnect 306 may be wire ribbon, or any other desired type of line connection and/or cable. In some embodiments, data may be received at the coaxial interface 312 in the form of multiple QAM channels carrying digital streams of audio and/or video data for programs, Internet data, etc. Those digital streams may be tuned and demodulated, and then provided across packet interconnect 306 as multiplexed streams of packets. The multiplexing may be accomplished in any desired way. For example, the various interfaces 311-315 may use a timeslotted approach to placing their respective data on the interconnect 306 (and thereby multiplexing their data). Alternatively, contention-based algorithms, token ring approaches, or any other shared medium transmission technique may be used.

The packet interconnect 306 may connect to the transport processor 320. The transport processor 320 may generally be responsible for de-multiplexing the various streams of data, processing them for distribution within the home, and passing the data along to the in-home network 202 for distribution. In the reverse direction, the transport processor 320 may receive outgoing data from the various devices over the in-home network 202, and process them for transmission to the appropriate access network via the tuner/demod circuit 310.

The transport processor 320 may include a transport demultiplexer/multiplexer 321. That transport demux/mux 321 may be a circuit configured to separate individual transport streams contained in the incoming data carried in by the packet interconnect 306, and to combine outgoing data into one or more multiplexed streams to go across packet interconnect 306. The transport demux/mux 321 may operate at the direction of processor 302.

The transport processor 320 may include an audio content processor 322 and a video content processor 323. Those processors may include circuitry configured to process audio and video content data either for incoming reception or for outgoing transmission. So, for example, incoming video content data may be received at the demux 321, and passed to the video content processor 323 for processing prior to transmission to the end user device. Any desired type of video processing may be performed. For example, if the incoming video content was formatted for high-definition (HD) television display, but the end user device is not an HD television (e.g., it is a standard definition (SD) television, or a personal computer monitor), the video processor 323 may convert that video data from an HD format to the appropriate format, and repackage it for transmission out to the user device. Other types of video processing can include format conversion, color adjustment, brightness adjustment, image resizing/cropping, resolution up/down conversion, etc. Similarly, any desired type of audio processing such as volume limiting, channel combining/separation, frequency equalization, etc., may be performed by audio processor 322.

The transport processor 320 may also include a graphics processor 324. The graphics processor 324 may be configured to add graphical data onto a video image (e.g., adding a textual message to a received video signal). For example, if the service entry controller 301 learns that an incoming telephone call has been received via the twisted pair interface 306, the controller 301 may direct the graphics processor 324 to generate a pop-up display to overlay a video image that is displayed on a user's computer screen or television, informing the user of the call. The graphics processor 324 may also generate new video images, such as user interface screens to allow a user to control the operation of the service entry device 201 using one of the devices in the home.

The transport processor 320 may also include a trans-crypt processor 325. The trans-crypt processor 325 may include circuitry configured to handle security, such as the encryption/decryption of protected content, the management of security keys, etc. For example, when encrypted video content is received via the coaxial interface 307, that encrypted content may be passed to the trans-crypt processor 325 for decryption prior to further handling. Similarly, for outgoing transmissions, the trans-crypt processor 325 may conduct encryption operations on the data to be transmitted.

The transport processor 320 may further include an IP packet processor 326. The IP packet processor 326 may be configured to handle the data management associated with Internet Protocol transmissions. For example, the IP packet processor 326 may be responsible for properly formulating IP packets, identifying IP addresses for devices (in the home, or on an external access network) that are to receive data, issuing domain name server (DNS) lookup requests, etc.

The IP packet processor 326 may also be responsible for managing the flow of data across the in-home network 202. In some embodiments, the in-home network may be implemented as an IP network, where some or all of the devices are assigned a unique IP address.

Incoming data leaving the transport processor 320 may be delivered to the in-home network's IP encapsulator 330, which may be at the service entry controller 301 edge of the in-home network 202. The IP encapsulator 330 may perform any desired IP encapsulation (or de-encapsulation) on the data. For example, outgoing data from a device may be encapsulated into a lower layer for transmission, used by the IP packet processor 326 for further transmission across the access network.

As noted above, the in-home network may include any type of transmission media, such as Ethernet wiring, to various locations within the user's home. The various clients 203a may be connected to this network, and each client may be responsible for managing the communications that involve the devices at that client's location. To that end, the client may include its own processing circuitry 340 (which may include a microprocessor executing instructions stored on a memory, or computer-readable medium), and various interfaces to connect to the various user end devices. Those interfaces may be controlled by respective controllers (which may be incorporated into circuitry 340 if desired). For example, wireless controller 341 may be responsible for managing a local wireless access point at the client's location. Ethernet controller 342 may be responsible for managing communications across one or more Ethernet ports of the client 203a. Coaxial controller 343 may be responsible for managing communications across a coaxial interface with end devices that receive data over a coaxial connection (e.g., a set-top box). Optical controller 344, USB controller 345 and twisted pair controllers 346 may similarly be responsible for managing communications with end devices across their respective optical/USB/twisted pair interfaces.

The service entry device 201 may simplify the process of altering communication protocols. For example, changes to the in-home network communication protocol may be made without requiring cooperation of the external access networks. Those protocol changes may simply be made in conjunction with the service entry device 201, and communications with the external access networks need not be affected. Similarly, changes to one of the external access network need not involve every in-home user device, since a change to the protocol at the service entry device 201 may be sufficient.

Figure 4:
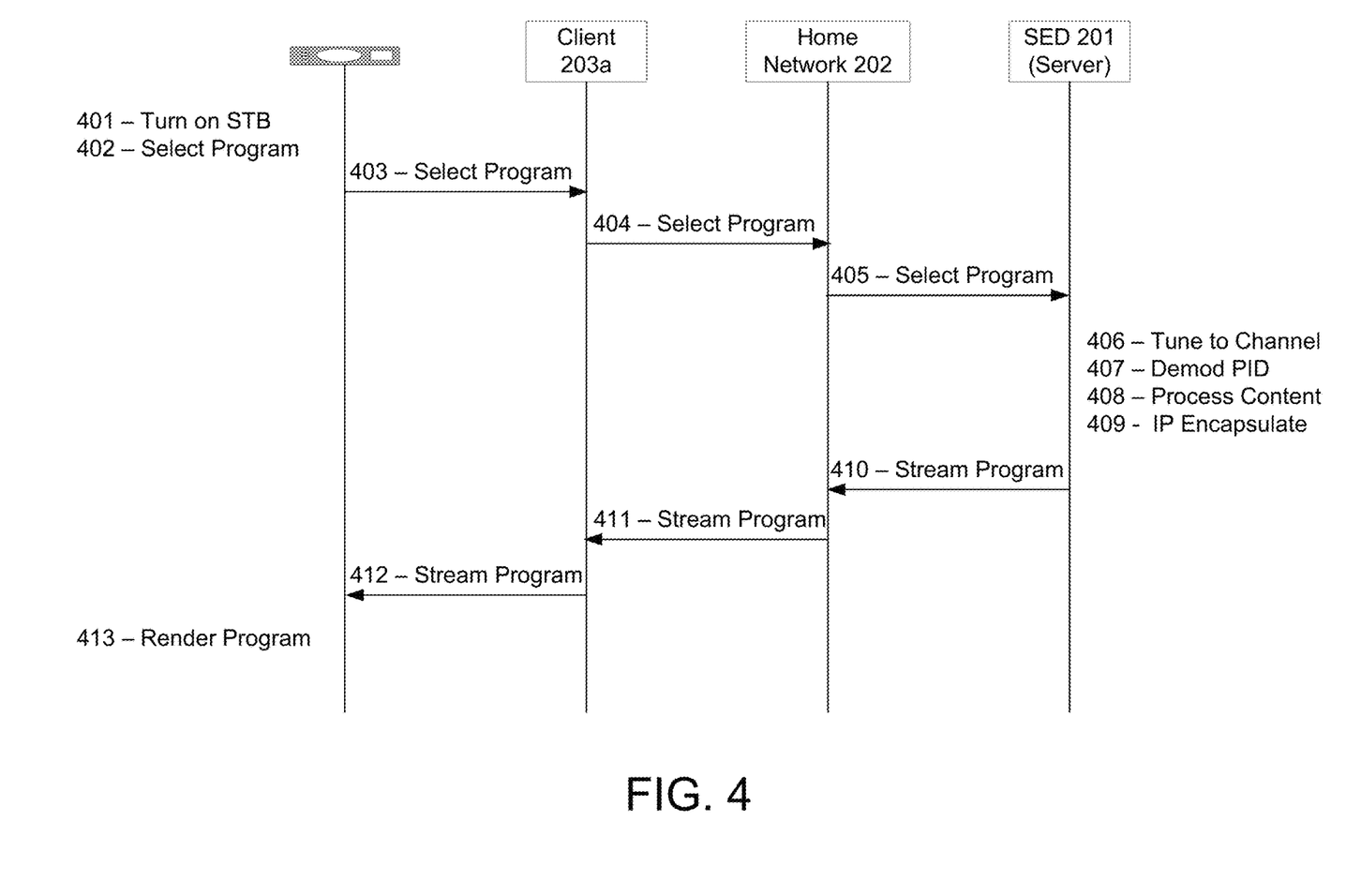
FIG. 4 illustrates an example signal flow for an example use of the service entry point device shown in FIGS. 2-3.

FIG. 4 illustrates an example process flow for one example use of the service entry device 201. The service entry device 201 may act as a server to the clients 203a-c (only 203a is illustrated by example), and ultimately to the end devices that may request action. In the FIG. 4 example, in step 401, the end device may first be brought online or turned on. For example, a set-top box may be turned on by the user. This step may also include the user identifying him/herself to the set-top box. In step 402, the user may select a program to watch.

In step 403, the set-top box may transmit a request to the client 203a, requesting the program, and the request may also include the user identification. This request may be transmitted in the same manner that legacy set-top boxes use (e.g., via upstream DOCSIS-compliant signaling), or it may be transmitted using a different technique, such as with a basic IP packet request.

In step 404, the client 203a receives the request, and processes for further transmission on the home network 202. This may include, for example, encapsulating the request into an IP packet addressed to the service entry device 201, acting as a server to the client 203a, and placing the encapsulated request packet onto the home network 202 for delivery according to the home network 202 protocols.

In step 405, the service entry device 201 may receive the request from the in-home network 202, and the IP packet processor 326 may strip out the IP packet and deliver the payload (request) to the processor 302. In response, in step 406, the processor 302 may generate an instruction for the coaxial interface 312 to tune to the appropriate QAM channel carrying the requested program content. In step 407, the coaxial interface 312 may tune to and demodulate that QAM channel, and may deliver the request program stream to the video processor 323 and audio processor 322. In step 408, the audio/video processors 322/323 may process the incoming stream to generate audio/video content that can be provided to the end device (the requesting STB).

In step 409, the processed incoming stream may be encapsulated for IP transport across the home network 202. For example, the stream packets may be addressed to the IP address of the client 203a and the STB. In step 410, the addressed stream packets may be delivered onto the home network 202. In step 411, the home network 202 may deliver the packets to the correct client 203a, and in step 412, the client 203a may process the packets to convert the stream data into the signals that can be handled by the STB. Then, in step 413, the STB processes those signals to render the program for display on the user's television.

Another example use of the service entry device is the storage of user profiles. Each user in the home may create and store a set of preferences and profile information with the service entry controller 301. For example, the controller 301 may include a desktop computer with user interface, and may prompt a user to input the user's preferences. Any type of preference may be stored, and for any type of user device in the home. For example, preferences for a set-top box 108/116 may include a user's favorite channels, an identification of last program watched, volume settings, etc. Preferences for a telephone 114/115 may include list of contacts, last number dialed, etc. This user profile information may be stored in the storage 303 available to the controller 301.

The preferences may be used when the user migrates from device to device within the home. For example, if a user is watching television in the family room, and stops, the controller 301 may retain information identifying what the user was watching, and the point in the program, when the user stopped. If the user then resumes watching television the next day, and even if the user is at a different television (e.g., a television in a bedroom), the controller 301 may recall that profile information, and deliver the program beginning at the point the user left off. So, to use the FIG. 4 example, if the user in step 402 asks to resume watching the last program, the service entry device controller 301 (in SED server 201) may access that last program (e.g., from storage 303, if it was stored) and stream that program to the end device (e.g., instead of tuning in step 406, it may retrieve from storage). If the program is not stored at the controller 301, it may transmit a request up to the access network (e.g., the cable company headend) for a video on demand stream of the desired program, at the desired position.

In addition to storing user profiles, the service entry device may also store device profile information in the storage 303. Device profile information may be any type of data file specifying characteristics of the various devices within the in-home network. For example, each television 109/117 may be listed with its own device profile, and the profile for each might identify the television's location within the home (e.g., which client 203a-c provides its data), the television's picture size and/or resolution (e.g., HD or SD), the television's audio capabilities (e.g., number of audio channels, types of channels, frequency range, location of speakers, etc.), the physical interface supplying data to the television (e.g., HDMI, component, composite, wireless, etc.). The service entry device 201 may use this profile information to make determinations about how content should be formatted for delivery.

Figure 5:
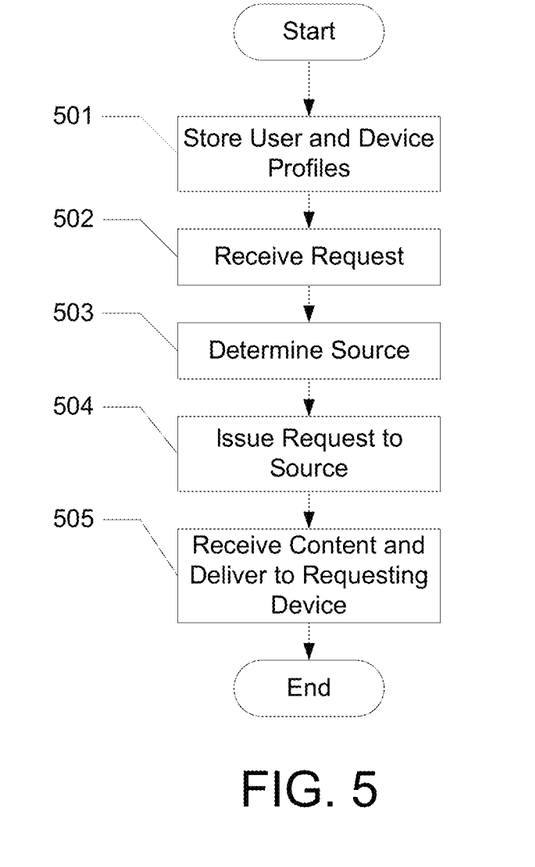

FIG. 5 illustrates an example flow for such a feature, from the perspective of the service entry device 201. In step 501, the service entry device 201 may first store user and device profile information in storage 303. As noted above, the device profile information may contain various device characteristics/parameters/settings for the devices within the home (e.g., indicating television 117 is an HD television), and the user profile information may store information corresponding to the various users (e.g., Tommy's list of favorite channels, his favorite volume settings, etc.).

In step 502, the service entry device 201 may receive a request from a user. The request may be, for example, to begin watching a television program on channel 234. The request may originate from the user's set-top box 108, and the set-top box 108 may transmit the request to its client 203c using the set-top box 108's own protocol, but the client 203c may convert the request to a format suitable for the home network 202 and the service entry device 201. So, for example, the client 203c may prepare an IP data packet containing data identifying the requested program, channel/service, set-top box 108, television 109, client 203c, source and/or external network from which the requested content is available, and the user, and may send this request packet to the service entry device 201 via the home network 202.

At step 503, the service entry device may determine the source from which the requested content will be retrieved. The source may simply be the same source that the set-top box 108 would normally access if it were directly connected to its external network (e.g., the local cable television company's headend). Alternatively, the service entry device 201 may conduct one or more queries and searches to determine whether the requested content is available from an alternative source. For example, if the request originally identified a satellite provider (and the satellite 104 external network) as the source, the service entry device 201 may determine that the same requested content is available from the cable company over a different external network (e.g., the fiber/coax network connected to interface 101), and may decide to retrieve the requested content from that alternative provider instead. This may be advantageous, for example, if the alternative provider is cheaper, or if the available bandwidth is greater on the alternate external network at the moment. In some embodiments, the service entry device 201 may request that the various sources of the content also reply with the characteristics of their available version of the content (e.g., compression type, coding/decoding, encryption, picture resolution, color palette, audio type/number of channels, file size, etc.), and the service entry device 201 may compare the characteristics of the available versions with a characteristic profile for the device that will be consuming the content (e.g., the user's television). The service entry device 201 may choose the one that matches the end user's device profile, or if a perfect match is not found, the device 201 may choose the version that is closest (e.g., requires least amount of additional processing to fit the end device's profile).

In step 504, the service entry device 201 may issue a request to the source, and may transmit this request to the source using the appropriate interface circuit 311-315. In response, the requested content may then be received in step 505 at that interface from the source, and may be supplied to the interconnect 306, IP encapsulator 330, client 203c, and eventually to the requesting set-top box 108 for display on the television 109. The service entry device 201 may, if needed, perform additional processing on the content to place it in a format that is suitable, according to its profile, for the end device that will be consuming the content.

In some embodiments, the service entry device 201 may switch from one source to another while the user is viewing the content. The switch may be triggered by a change in conditions with the user's device. For example, if the user is using a portable laptop computer to watch a movie, and plugs his/her computer into an Ethernet connection port midway through the movie, then the desired or permitted bitrate at the laptop may change. The initial bitrate may have been based on a wireless connection (which may or may not have been a good connection to begin with), and the new bitrate may be much higher given the greater bitrate and reliability of the wired Ethernet connection over the initial wireless connection. When the user plugs that laptop in, the laptop may signal a change in its network connectivity to the service entry device 201. The service entry device 201 may consult previously-stored responses to identify whether a different source had a higher bitrate version available that is suitable for the new connection (or alternatively, the device 201 can broadcast another request to the various sources), and select an alternative source to supply the remainder of the program.

In such a situation, the device 201 may transmit instructions to both the current and the future source, indicating that a switch is to occur, and providing a time stamp for the current playback and time offset at which the switch is to occur. The time offset may be, for example, chosen to be 2 minutes from the current time in the movie. Both of the sources may then consult their source files for the movie to identify a suitable point in the movie for the transition. For example, the sources may select a point, 2 minutes in the future, at which there is a change in the movie's group of pictures (e.g., a scene change). The sources may communicate to each other to coordinate the change. Alternatively, the new source can simply begin to transmit its version of the source, beginning at the desired transition point, and the service entry device 201 may buffer it until the 2 minute point arrives. The old source can simply terminate its stream after the transition point arrives.

Additionally, the service entry device 201 may allow devices within the home to share content. In the example above of the user watching television, if the program happened to be stored in a hard drive of a set-top box 108 (e.g., DVR), but the user wanted to watch the show on a personal computer 111, the service entry device 201 may transmit a request to the set-top box 108 for the retrieval of that content. The set-top box 108 may then supply it to the computer 111 using the in-home network and corresponding clients 203b-c. In transferring the content, the service entry device 201 may recall the user profile, and inform the set-top box 108 of the point at which the playback is to resume. Furthermore, the content may be adjusted/reformatted from an HD television format to a PC monitor format (e.g., reducing display resolution) to accommodate the new playback device. This reformatting may be performed by the service entry device's audio/video processors (322/323), the intervening clients 203b-c, the set-top box 108, PC 111, or any combination of those devices.

Figure 6:
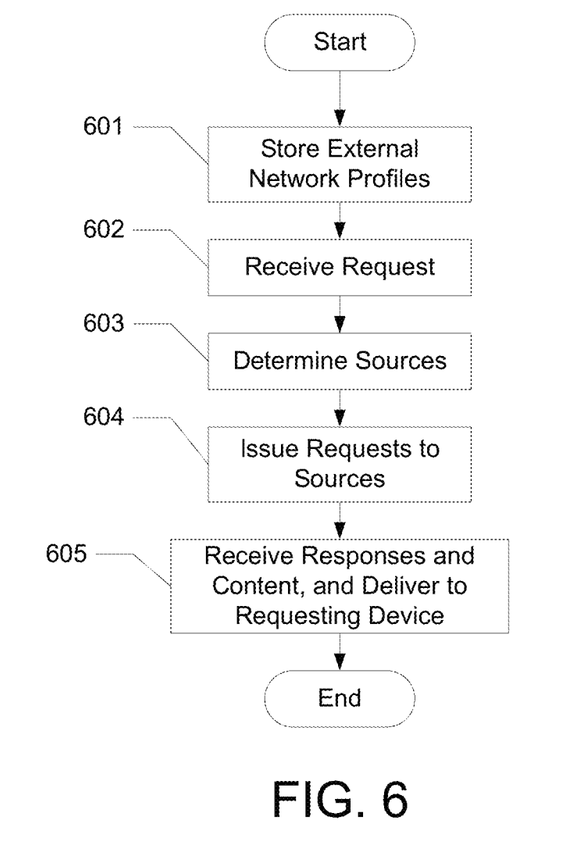
FIG. 6 illustrates an alternative example request process, using the example structures shown in FIG. 2.

FIG. 6 illustrates another example of how the service entry device 201 may aggregate external networks for the benefit of in-home devices. In this example, the service entry device 201 may simplify a subscriber's access to a variety of network resources. In step 601, the service entry device 201 may first store profile information identifying characteristics of the various external networks to which it is connected. This profile information may include, for example, identification of external networks, user and account information identifying the subscriber or household to those networks, and identification of the various capabilities and resources available on the network. For example, a cable television network may have, at its headend, access to the cable television network's program guide databases, video on demand databases, and other services. Similarly, a telephone company's local exchange may store data identifying phone numbers for various individuals, a cellular telephone network may store information regarding whether a particular user has an active account and, if so, the general location of the user, and the satellite service provider may store its own database identifying video offerings available through the satellite network. Additionally, any and/or all of these external networks may provide connectivity to the Internet, such that they each may offer access to any of the various services and information sources available on the Internet.

The service entry device 201 may aggregate all of these resources, making them all available to the subscriber in the home. So, for example, the user may issue a single request to the service entry device 201, and the device 201 may in turn issue a plurality of queries to different external networks in response to the request. As one example, in step 602, the subscriber may use his/her television 109 and set-top box 108 to enter a general query, such as "Show me more information about Kevin Bacon." The query may be a textual query entered through the set-top box remote control and/or onscreen keyboard.

In step 603, the service entry device 201 may consult the external network profiles to determine which external networks might have information relevant to the query. In some embodiments, the device 201 may simply assume that all of its connected external networks may have relevant information. In other embodiments, the device 201 may preprocess the request to weed out unlikely candidates. For example, since Kevin Bacon is an actor, the cable television network (via interface 101) and satellite network (via interface 103) are more likely to have content relating to actors (e.g., movies, bios, merchandise, etc.) than other networks like the telephone company or cellular telephone network. This preprocessing may be performed internally by the device 201 using, for example, a database mapping keywords to one or more external networks, or alternatively, the preprocessing may be performed offsite, in which case the device 201 may transmit an initial preprocessing query to a server, requesting identification of external networks that may have relevant information.

In step 604, the device may translate the query into the appropriate format for the various external networks, and may transmit the query on each of the multiple external interfaces to their corresponding external network. To support such a feature, each of the external networks may also include its own server, interfacing with the subscriber's home, and configured to process queries.

In step 605, the device 201 may receive various responses from the external networks to which it sent the "Kevin Bacon" inquiry. The results may be presented to the user at the requesting device (e.g., set-top box 108 and television 109), and may combine results from a variety of external networks and sources. For example, the "Kevin Bacon" query may return a listing (with description, play times, cost, channels, preview clips, etc.) of Kevin Bacon movies available from the cable television network over interface 101, a listing of such movies available from the satellite network over interface 103, an indication over interface 102 that his phone number is unavailable from the telephone network, etc. The device 201 may also receive responses from Internet servers using any of the available interfaces, and may receive responses from Internet resources, such as links to fan web sites, social networking sites relating to (or attended by) the actor, retailers selling Kevin Bacon merchandise, and others.

As another function, the service entry device controller 301 may implement policy on the home network. The policy may define how communications are to be handled within the home, and how the in-home devices are to access the external access networks. One policy determination may be priority. The service entry controller 301 may store priority information (which may be defined by the user) indicating a priority among the various users in the home, a priority among the various devices in the home, and/or a priority among the various types of communications (e.g., incoming, outgoing, voice, video, gaming, etc.). The service entry device controller 301 may use this policy/priority information to determine which pieces of communication are handled first. For example, voice signals for a phone call may take highest priority, while best-efforts signals such as Internet downloads may take lowest priority.

The above description and drawings are illustrative only, and modifications may be made as desired. For example, references to "circuitry" or "processors" may include software executing on a microprocessor, hard-wired circuitry (e.g., analog), or any combination of the two. The various illustrated components are shown separately for ease of explanation, but in implementation the various components may be combined and/or further separated as desired. For example, the various processors shown in the transport processor 320 may be combined into a single integrated circuit.

The features herein are not limited to the illustrated embodiments, and all embodiments of the invention need not necessarily achieve all of the advantages or purposes, or possess all characteristics, identified herein. For example, modified versions of the service entry device 201 may omit some illustrated components if desired.

The invention claimed is:

1. A method comprising:
    receiving, by a computing device and from a requesting device, a request for a content item;
    receiving, by the computing device and from a first source device associated with a first external access network, a first portion of the content item;
    transmitting, by the computing device and to the requesting device, the first portion of the content item in response to the request for the content item; and responsive to a change in a bitrate associated with the requesting device:
  transmitting, by the computing device and to each of the first source device associated with the first external access network and a second source device associated with a second external access network, an instruction indicating a switch from the first external access network and to the second external access network for supplying a second portion of the content item, wherein the instruction comprises a current playback time of the content item and a time at which the switch is to occur, and wherein the second external access network is different from the first external access network;
  buffering the second portion of the content item received from the second external network; and
  transmitting, by the computing device and to the requesting device, the buffered second portion of the content item when the switch from the first portion to the second portion is to occur.

2. The method of claim 1, wherein the switch occurs during playback of the content item by the requesting device.

3. The method of claim 1, further comprising:
responsive to the change in the bitrate associated with the requesting device, transmitting, by the computing device, to a plurality of source devices associated with different external access networks, and via a plurality of external network interfaces, a plurality of requests for the second portion of the content item, wherein the plurality of source devices comprises the second source device associated with the second external access network.

4. The method of claim 3, further comprising:
in response to transmitting the plurality of requests, receiving, by the computing device and from at least the second source device associated with the second external access network, a response.

5. The method of claim 1, wherein the time at which the switch is to occur is specified as an offset relative to the current playback time of the content item.

6. The method of claim 1, further comprising:
scheduling the time at which the switch is to occur; and performing the switch at the scheduled time.

7. A method comprising:
receiving, by a computing device and from a requesting device, a request for a content item;
transmitting the content item from a first source device associated with a first network, to the requesting device via a first network interface of the computing device that is associated with the first network; and
in response to determining that a network change condition associated with a bitrate has been satisfied by the requesting device,
  transmitting, by the computing device and to each of the first source device associated with the first network and a second source device associated with a second network, an instruction indicating a switch from the first source device and to the second source device for supplying the content item, wherein the instruction comprises a current playback time and a time at which the switch is to occur, and wherein the second network is different from the first network;
  buffering, by the computing device, a portion of the content item received from the second network;
  responsive to a determination that the time at which the switch is to occur has occurred, stopping the buffering of the portion of the content item; and
  switching from transmitting the content item from the first source device to transmitting the buffered portion of the content item from the second source device associated with the second network, to the requesting device, and via a second network interface of the computing device that is associated with the second network, wherein the switching occurs during playback of the content item by the requesting device.

8. The method of claim 7, wherein the first network comprises a cable television network and the second network comprises a twisted-pair telephone network or a fiber optic network.

9. The method of claim 7, further comprising:
transmitting, by the computing device and to a plurality of source devices, a plurality of requests for servicing the request, wherein the plurality of source devices comprises the second source device.

10. The method of claim 9, further comprising:
in response to transmitting the plurality of requests, receiving, by the computing device and from at least the second source device, a response.

11. The method of claim 7, further comprising:
determining, based on a timestamp at which there is a scene change in the content item, the time at which the switching is to occur.

12. The method of claim 1, further comprising:
determining, based on a timestamp at which there is a scene change in the content item, the time at which the switching is to occur.

13. The method of claim 1, further comprising:
determining, based on a timestamp at which there is a change in a group of pictures in the content item, the time at which the switching is to occur; and
performing the switch based upon the determined time at which the switching is to occur.

14. An apparatus comprising:
one or more processors; and
memory storing instructions that, when executed by the one or more processors, cause the apparatus to:
  receive, from a requesting device, a request for a content item;
  receive, from a first source device associated with a first external access network, a first portion of the content item;
  transmit, to the requesting device, the first portion of the content item in response to the request for the content item; and
  responsive to a change in a bitrate associated with the requesting device:
  transmit, to each of the first source device associated with the first external access network and a second source device associated with a second external access network, an instruction indicating a switch from the first external access network and to the second external access network for supplying a second portion of the content item, wherein the instruction comprises a current playback time of the content item and a time at which the switch is to occur, and wherein the second external access network is different from the first external access network;
  buffer the second portion of the content item received from the second external network; and transmit, to the requesting device, the buffered second portion of the content item when the switch from the first portion to the second portion is to occur.

15. The apparatus of claim 14, wherein the switch occurs during playback of the content item by the requesting device.

16. The apparatus of claim 14, wherein the memory further stores instructions that, when executed by the one or more processors, cause the apparatus to:

responsive to the change in the bitrate associated with the requesting device, transmit, to a plurality of source devices associated with different external access networks, and via a plurality of external network interfaces, a plurality of requests for the second portion of the content item, wherein the plurality of source devices comprises the second source device associated with the second external access network.

17. The apparatus of claim 16, wherein the memory further stores instructions that, when executed by the one or more processors, cause the apparatus to:

in response to transmitting the plurality of requests, receive, from at least the second source device associated with the second external access network, a response.

18. The apparatus of claim 14, wherein the memory further stores instructions that, when executed by the one or more processors, cause the apparatus to:

schedule the time at which the switch is to occur; and perform the switch at the scheduled time.

19. The apparatus of claim 14, wherein the memory further stores instructions that, when executed by the one or more processors, cause the apparatus to:

determine, based on a timestamp at which there is a scene change in the content item, the time at which the switching is to occur.

20. The apparatus of claim 14, wherein the memory further stores instructions that, when executed by the one or more processors, cause the apparatus to:

determine, based on a timestamp at which there is a change in a group of pictures in the content item, the time at which the switching is to occur; and perform the switch based upon the determined time at which the switching is to occur.

* * * * *

UNITED STATES PATENT AND TRADEMARK OFFICE
CERTIFICATE OF CORRECTION

PATENT NO. : 9,854,297 B2
APPLICATION NO. : 13/944414
DATED : December 26, 2017
INVENTOR(S) : Mark Francisco Page 1 of 1

It is certified that error appears in the above-identified patent and that said Letters Patent is hereby corrected as shown below:

Column 3, Detailed Description, Line 34:
Please delete "Allliance," and insert --Alliance,--

Column 4, Detailed Description, Line 53:
Delete "304" and insert --310--

Column 6, Detailed Description, Line 63:
Delete "307," and insert --312,--

Signed and Sealed this
Fifth Day of June, 2018

Andrei Iancu
*Director of the United States Patent and Trademark Office*